United States Patent [19]

Norgaard

[11] 4,443,889

[45] Apr. 17, 1984

[54] ACOUSTIC APPARATUS AND METHOD

[75] Inventor: Donald E. Norgaard, Mountain View, Calif.

[73] Assignee: Nortech Laboratories Ltd., San Francisco, Calif.

[21] Appl. No.: 142,131

[22] Filed: Apr. 21, 1980

[51] Int. Cl.³ .............................................. H04M 1/00

[52] U.S. Cl. ......................................... 381/24; 381/27

[58] Field of Search ................ 179/1 G, 1 VE, 1 SW, 179/1 GA, 1 GP; 381/1, 24, 27, 28, 86, 17, 10

[56] References Cited

U.S. PATENT DOCUMENTS

| | | | |
|---|---|---|---|
| 2,845,491 | 7/1958 | Bertram | 179/1 G |
| 3,171,891 | 3/1965 | Amos et al. | 179/1 G |
| 3,184,550 | 5/1968 | Rogers | 179/1 G |
| 3,249,696 | 5/1966 | Van Sickle | 179/1 G |
| 3,397,286 | 8/1968 | Prewitt et al. | 179/1 VE |
| 3,637,938 | 1/1972 | Kuhlow et al. | 179/1 G |
| 3,697,692 | 10/1972 | Hafler | 179/1 |
| 4,164,625 | 8/1979 | Igeta | 179/1 G |

OTHER PUBLICATIONS

Adding the Third Channel: High Fidelity Magazine; Apr. 1959, pp. 109, 125, 126.

*Primary Examiner*—John C. Martin
*Assistant Examiner*—Edward L. Coles
*Attorney, Agent, or Firm*—A. C. Smith

[57] ABSTRACT

An improved method and apparatus for reproducing sound includes a third channel which is derived from the pair of signals representing traditional left and right stereophonic channels and which represents a linear algebraic difference between such a pair of signals. A third loudspeaker associated with the third channel povides acoustic radiation as a supplement to acoustic radiation from two laterally-spaced loudspeakers normally used to reproduce respective left and right signal channels. Acoustic radiation from the third loudspeaker is toward a preferred listening region and in a direction substantially opposite to that from the two laterally-spaced left and right loudspeakers which are positioned and oriented to provide essentially codirectional acoustic radiation toward the preferred listening region. Preferred embodiments incorporate amplifier and matrixing circuitry to derive the third channel signal and to adjust the level of sound radiated by the third loudspeaker relative to that of sound radiated by left and right loudspeakers.

4 Claims, 5 Drawing Figures

ACOUSTIC APPARATUS AND METHOD

BACKGROUND OF THE INVENTION

Early stereophonic techniques featured directionality or "stereo imagery" by means of exaggerated signal manipulation. The "ping pong" transfers of virtual sources from side to side bear little resemblance to musical performances ranging from a solo performer to a full symphony orchestra, but instead serve to misdirect attention away from reality and toward "separation" as the hallmark of stereophonic sound. See, for example, U.S. Pat. Nos. 3,247,321, 3,184,550, 3,478,167, 3,171,891, and 3,280,258. This attention to separation has served to set unrealistic and unattainable goals in the quest for acceptable imitation of the original sound. Primary sounds are strongly affected by the acoustical characteristics of the immediate surroundings, whether they be a concert hall, a small studio, or even out-of-doors. The sense or hearing apparently involves a continuing spacetime analysis unconsciously performed by the ear/brain combination, and it is this analysis that provides the unmistakable credibility of real sound in a real location.

In the case of reproduced sound, the additional effect of acoustical characteristics of the region where the sound is reproduced combines irreversibly with the sound which might otherwise be heard at the original site, with the result that the final effect can be interpreted by the highly organized hearing mechanism as synthetic rather than natural.

The hearing sense relies strongly upon an "ambiance" created by a multitude of acoustic reflections and absorptions always present in any site where a sound occurs, and it is this feature which provides authenticity to what is heard. The nature of the ambiance, moreover, is transient due to reflections and absorptions which combine differently with direct sounds in a complex manner depending on the sonic radiation pattern of the source, its frequency, timbre, and location in any physically realizable surrounding. A spatially-distributed source such as an orchestra compounds this intrinsic complexity to an enormous degree. Restoration of an initial ambiance at the site of acoustic reproduction is the foundation of acoustic reality as interpreted by the hearing mechanism.

SUMMARY OF THE INVENTION

In accordance with this invention conventional two-channel stereophonic signals are utilized to create a third related signal channel used to provide an additional source of sound which supplements the traditional pair of stereophonic acoustic sources by the process of sonic combination at the site of sound reproduction so that an acceptable level of acoustic reality may be perceived over a relatively large portion of the region where sound is reproduced. This relieves restrictions on where listeners may be positioned for essentially optimum acoustic effect.

The present invention permits creation of acoustic ambiance in the general region of sound reproduction in order to diminish the effect of artificial sound sources which compete with each other for the listener's attention and serve to destroy the illusion of credibility or naturalness. Also, the present invention provides an apparent extension of frequency range of reproduced sound, particularly in the low frequency region of human hearing where convincing bass response essential to the illusion of reality in reproduced sound is especially difficult to achieve.

Description of the Preferred Embodiment

Figure 1:
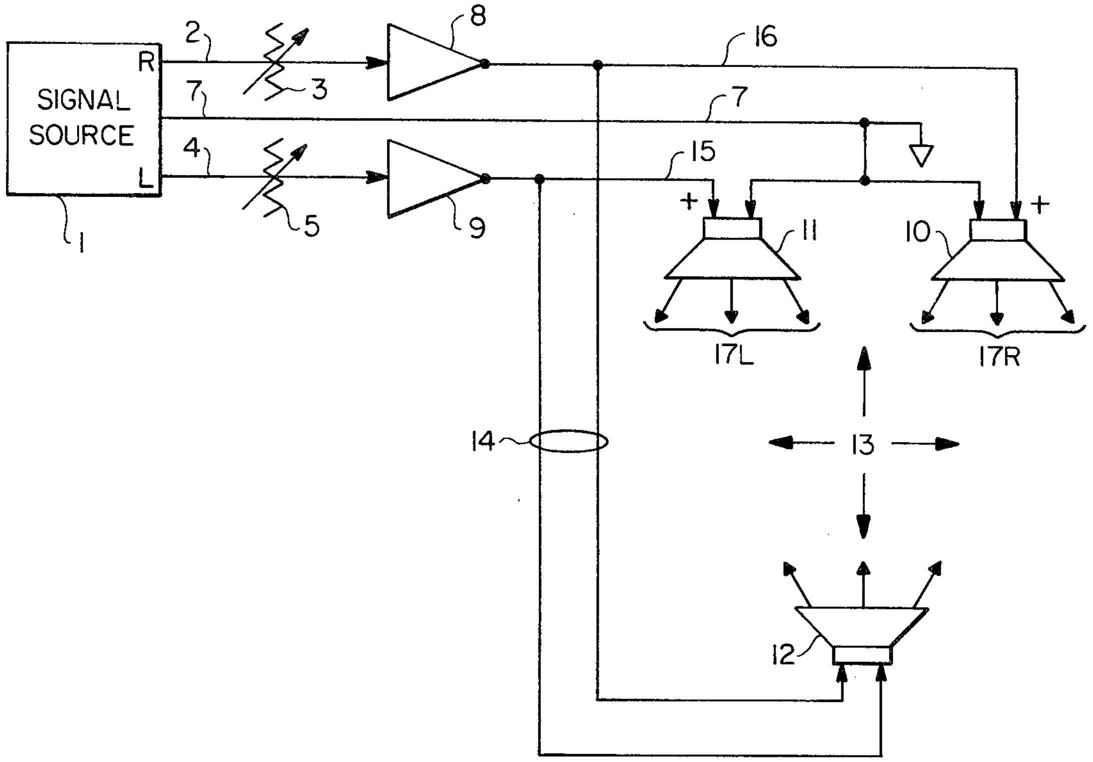
FIG. 1 is a block diagram of one embodiment of the invention.

The block diagram of FIG. 1 illustrates a system according to the invention in which a source 1 of left- and right-channel stereophonic signals such as a stereo receiver, tape player, phonograph, or the like, supplies left-channel signal 4 and right-channel signal 2 through level controls 5 and 3 to power amplifiers 9 and 8, respectively. These level controls may be ganged together for convenience of operation, or may be operated independently. A common or ground reference conductor 7 serves to delineate the respective left- and right-channel signals for both input and output paths. Output signals from the power amplifiers 9 and 8 are supplied to respective left and right loudspeakers 11 and 10 by conductors 7 and 15 for the left loudspeaker and by conductors 7 and 16 for the right loudspeaker. As described thus far, the named elements comprise a conventional stereophonic reproducing system wherein the quality of signals provided by source 1 and the quality and power-handling capabilites of amplifiers 9 and 8 as well as loudspeakers 11 and 10 determine overall stereophonic performance. It is normal practice to separate loudspeakers 11 and 10 by several feet and to direct their principal axes of sound radiation forward toward a preferred listening region 13, as indicated by arrow clusters 17L and 17R. It is customary for listeners to face the loudspeakers 11 and 10 in simulation of the general practice of facing performers during a live performance. It is also general practice to utilize matching front loudspeakers, which may be of multiple-transducer design, to avoid preferential treatment of either channel.

Acoustic combination of the sounds radiated independently by loudspeakers 11 and 10 produces at almost all reasonable locations within the listening region 13 a resultant acoustic field which closely resembles that which would otherwise be produced by two identical signals which represent the algebraic sum of left- and right-channel signals supplied at equivalent levels to loudspeakers 11 and 10. In accordance with the present invention, an acoustic signal related to the linear algebraic difference between instantaneous values of left- and right-channel signals is radiated from a third loudspeaker 12 located substantially behind the listening region 13. The pair of conductors 14 serves to provide signal excitation for loudspeaker 12. The resulting sonic combination greatly enhances the credible illusion of reality in the sound perceived by listeners located generally within the listening region 13. FIG. 1 thus illustrates a system in which the third loudspeaker 12 located behind the listening region 13 is driven by a signal derived from the left- and right-channel signals and which signal represents the algebraic difference between the signals that drive loudspeakers 11 and 10.

The supplementing effect of the sound radiated from rear loudspeaker 12 takes the form of a type of derived ambiance or "phantom" acoustic energy which propagates in a general direction opposite to acoustic energy provided by the front pair of loudspeakers. This supplementary sound is instantaneously different (but not necessarily statistically different) from that produced by either or both front loudspeakers 10 and 11 and encounters totally different sets of multiple reflections and absorptions within the listening region 13. The cumulative effect as interpreted by the human hearing mechanism therefore approaches that experienced while listening at the site of the original sound as modified by the acoustical characteristics at that site.

It has been determined that the symmetry implied in FIG. 1 is not required for realization of the effect described above. Interpretation of total system performance is not significantly altered either by orientation of rear loudspeaker 12 or by the symmetry of the triangle determined by loudspeakers 10, 11 and 12 as well as orientation of a listener. Certain geometric restrictions on the preferred listening region 13 are due to the inverse square law of sound propagation, modified by the local acoustic characteristics of that site. Stated differently, a listener has a broad choice of both position and orientation in order to achieve nearly optimum acoustic effect in much the same sense as choice of seating in a concert hall.

Figure 2:
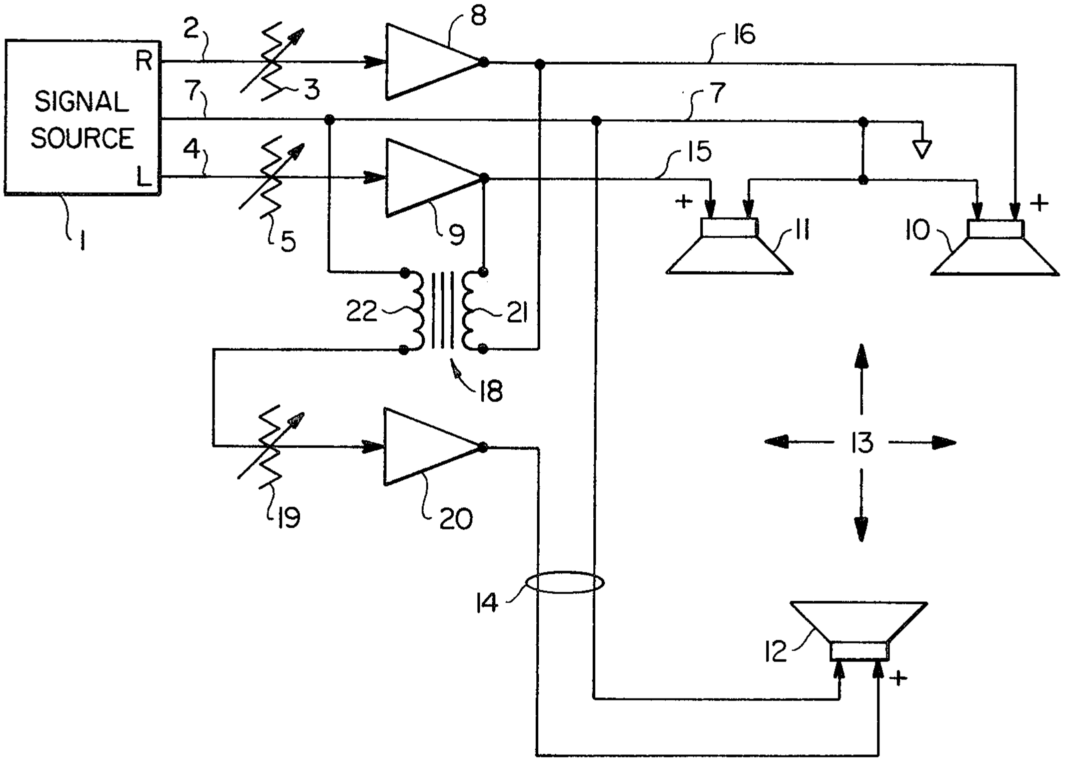
FIG. 2 is a block diagram of another embodiment of the invention.

FIG. 2 illustrates a system as in FIG. 1 (similar elements bear the same designations) in which adjustments may be made of output of loudspeaker 12 relative to that of front loudspeakers 10 and 11. In this system, primary winding 21 of a high impedance bridging transformer 18 is excited by a signal which is the algebraic difference between the signals used to drive loudspeakers 10 and 11. A secondary winding 22 of the transformer 18 provides the difference signal through adjustable attenuator 19 to a third power amplifier 20. The output of amplifier 20 drives the third or rear loudspeaker 12. The difference signal which appears across secondary winding 22 is referenced to common conductor 7 as indicated in FIG. 2. Because the impedance level of primary winding 21 can be significantly higher than that of loudspeakers 10 and 11, the added loading effect of transformer 18 on amplifiers 8 and 9 is inconsequential. A voltage step-down ratio of about 5:1 provided by bridging transformer 18 assures sufficient signal excitation for amplifier 20 to produce the desired effect.

The design of power amplifier 20 can be identical to that of power amplifiers 8 and 9, and other circuit details such as power supply, and the like, which may be of conventional design and connection to the active elements of the illustrated circuits have been omitted for clarity.

It should be noted that since signal power required to drive loudspeaker 12 at a chosen level is supplied by the third power amplifier 20 instead of by joint action of power amplifiers 8 and 9, as in the system of FIG. 1, total power requirements for the three power amplifiers in the system of FIG. 2 are lower than for operation of the system of FIG. 1 under conditions which provide the same relative power levels to the respective loudspeakers.

Figure 3:
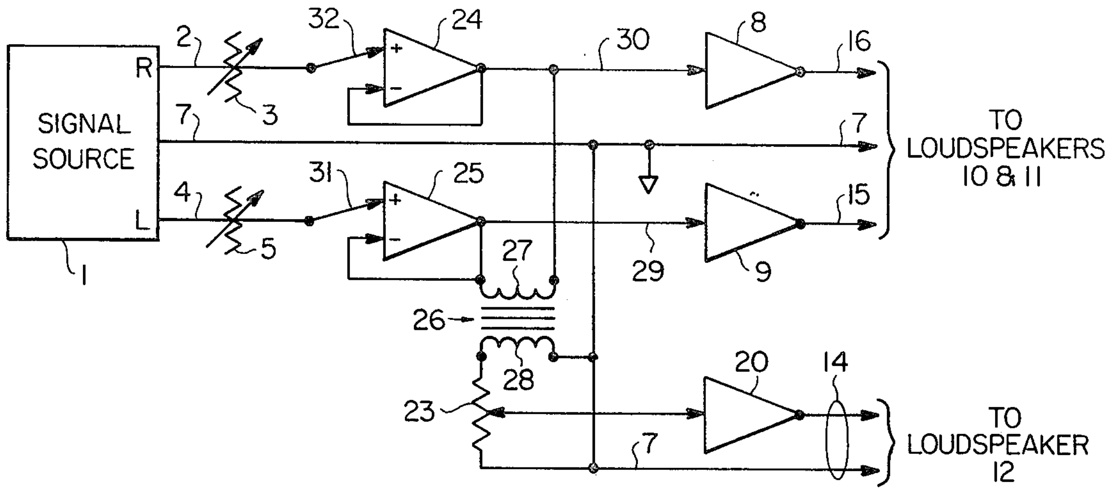
FIG. 3 is a block diagram of another embodiment of the invention.

In FIG. 3 (elements that are similar to those in FIGS. 1 and 2 bear the same designations), a signal representing the algebraic difference between left- and right-channel signals from the stereophonic signal source 1 is obtained by means of a high impedance bridging transformer 26 which has a primary winding 27 connected to receive left- and right-channel signals appearing on terminals 29 and 30. The secondary winding 28 of bridging transformer 26 supplies a ground-referenced difference signal to power amplifier 20 through a level-control potentiometer 23. The bridging transformer 26 should provide a voltage step-up ratio of approximately 3:1 if the voltage gains of power amplifiers 9, 8 and 20 are equal and loudspeaker input impedances and their conversion efficiencies are approximately equal.

Unity-gain, low-level, impedance-transforming amplifiers 25 and 24 are connected to the outputs of signal source 1 via the attenuators 3 and 5 to drive the powe-ramplifier input terminals 29 and 30 and the primary winding 27 of bridging transformer 26. Amplifiers 25 and 24, which may be integrated circuits, provide very low source impedance for driving primary winding 27 of transformer 26 and the power amplifiers 9 and 8. One advantage of the system illustrated in FIG. 3 over that of FIG. 2 is that distortion, noise, and other imperfections attendant to operation of power amplifiers 9 and 8 are not applied to amplifier 20 and thus not reproduced by loudspeaker 12.

Figure 4:
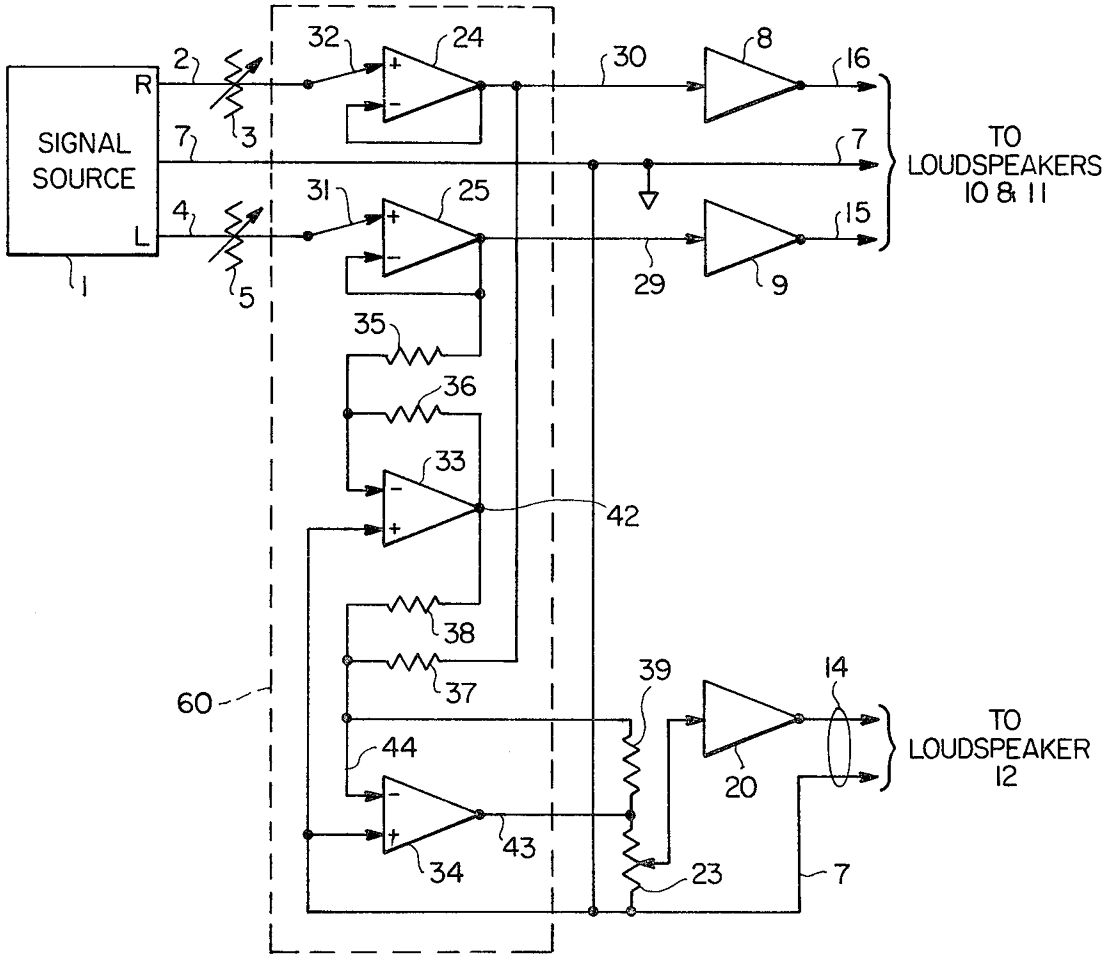
FIG. 4 is a block diagram of an alternative embodiment of the invention.

In the embodiment of the invention illustrated in FIG. 4 (elements which are similar to those in FIG. 3 bear the same designations), the function of transformer 26 in FIG. 3 is performed by operational amplifiers 33 and 34 and associated resistor network 35, 36, 37, 38 and 39. In this embodiment, amplifiers 33 and 34 each serve as phase inverters, wherein a signal voltage gain of (−1) is achieved through feedback connection of equal value resistors 35 and 36 in association with operational amplifier 33. If resistors 35, 36, 37 and 38 are of equal value, the algebraic sum of currents flowing through resistors 38 and 37 into circuit nodal point 44 represents the algebraic difference between left- and right-channel signals applied to power amplifier input points 29 and 30. Difference signal at the output 43 of operational amplifier 34, which acts as a summing amplifier having a voltage gain of R39/R37, is applied to adjustable attenuator 23 whose output serves to drive power amplifier 20 at an output level selected by the user to provide sound reproduction enhancement in accordance with the overall invention.

Because loudspeaker 12 primarily furnishes supplementary acoustical ambiance, this loudspeaker need not be of design similar to that of front loudspeakers 11 and 10. For example, it has been determined that reproduction of frequencies higher than 3000 to 4000 Hz. is not required for fulfillment of this function.

Figure 5:
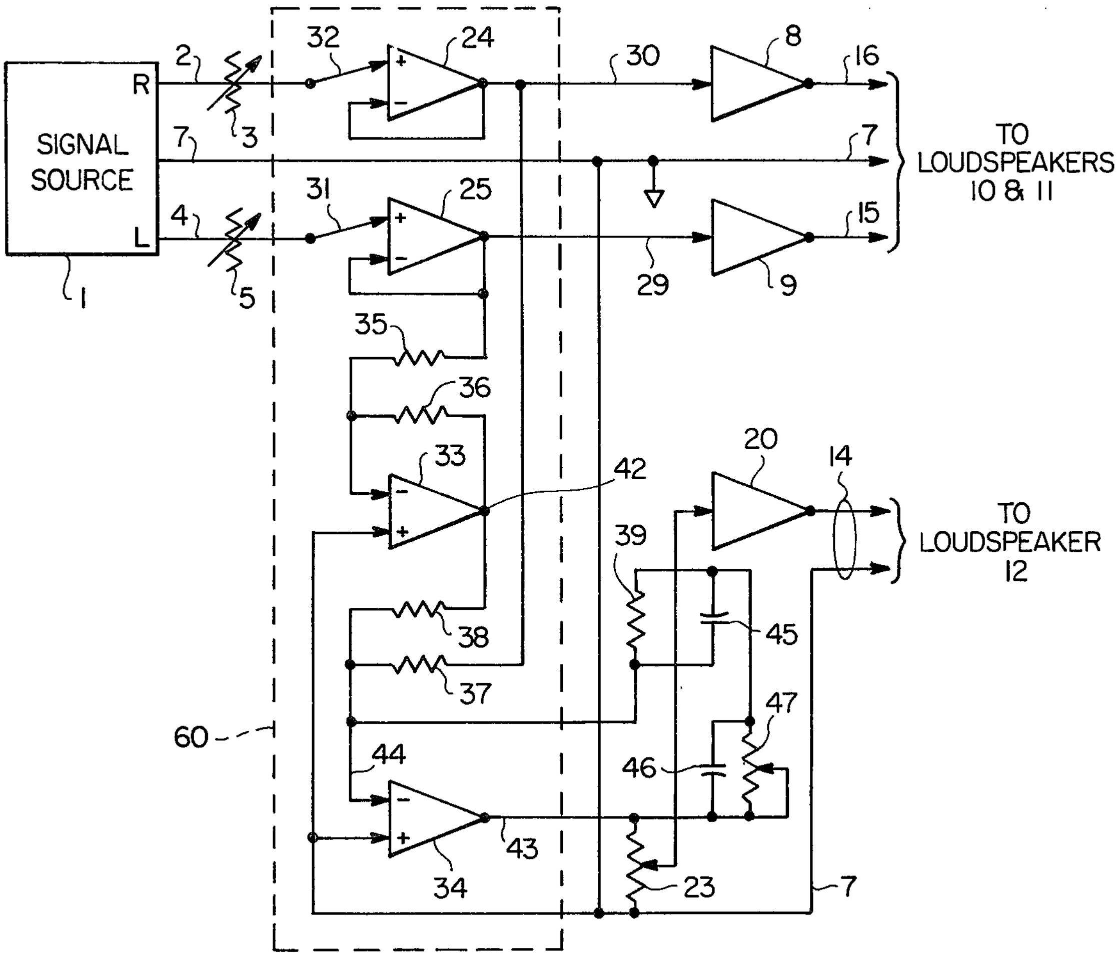
FIG. 5 is a block diagram of another embodiment of the invention.

In the embodiment illustrated in FIG. 5 (elements similar to those of FIG. 4 bear the same designations), a high-frequency rolloff is produced by capacitor 45 for frequencies above, say, 3000 Hz. in the signal channel which drives loudspeaker 12. In addition, bass boost of useradjusted amount is provided by capacitor 46 and adjustable resistor 47 for this signal channel. The purpose of this bass boost is to compensate for possible response deficiency of loudspeaker 12 at low frequencies where a low-cost loudspeaker might require disproportionately higher driving power in order to fulfill its role of supplying adequate low frequency acoustic output to be compatible with the output of front loudspeakers 10 and 11. Resistor 47 need be set only once for a given installation to establish bass response compatible with that of the front loudspeakers, and, as such, serves as a system "voicing" adjustment. Power amplifiers 8, 9, and 20 may be of identical circuit design and may have power output capability, frequency response, distortion and noise characteristics suited for a given overall system application.

Representative circuit design values applicable to FIGS. 4 and 5 are:

| | |
|---|---|
| Resistors 35, 36, 37 and 38 | 10,000 ohms; |
| Resistor 39 | 27,000 ohms; |
| Resistor 23 | 20,000 ohms; |
| Resistor 47 | 100,000 ohms; |
| Capacitor 45 | 0.0018 microfarad; |
| Capacitor 46 | 0.082 microfarad; and |
| Operational Amplifiers 24, 25, 33 and 34 | Type 741 (or equivalent). |

The operational amplifiers 24, 25, 33 and 34 in conjunction with resistors 35, 36, 37 and 38 (common to FIGS. 4 and 5) can be consolidated within a single specialized integrated circuit 60 which incorporates the eight above-named elements with appropriate internal connections and external terminals. Such integrated-circuit devices can be mass produced at low unit cost as small self-contained functional elements of high reliability. Such devices can be used in the embodiments of FIGS. 4 and 5 at low total system cost. It should be noted that this specialized integrated circuit does not place restraints on overall system performance parameters such as power output capabilities of power amplifiers 8, 9 and 20, for example.

Where desired, power amplifiers 8, 9 and 20, operational amplifiers 24, 25, 33 and 34 together with resistors 35, 36, 37 and 38 may be integrated within a single large-scale integrated-circuit package as a substantially complete functional embodiment of the invention. Provision must be made for removal of relatively greater amounts of heat dissipated within such a package, since the operating power levels can be many thousands of times greater than those of signal processing amplifiers 24, 25, 33 and 34 alone. The large-scale integration approach outlined above may place restraints on power output ratings and thus may not be applicable universally to every system installation.

I claim:

1. The method of processing two signal voltages representing respective left and right stereophonic channels to produce a third signal voltage linearly related to an instantaneous algebraic difference between said two signal voltages, comprising in sequence:

reversing polarity of one of said two signal voltages to produce a reverse-polarity replica thereof;

summing current proportional to said reverse-polarity replica with current proportional to another one of said two signal voltages; and providing a circuit path for resulting current sum through a common impedance to produce said third signal voltage thereacross.

2. Signal processing apparatus for operation with stereophonic signals represented by respective ground-referenced left and right signal channel voltages to produce a ground-referenced third signal channel voltage linearly related to an instantaneous algebraic difference between said left and right signal channel voltages, comprising:

amplifier means connected to receive both of said left and right signal channel voltages as input signals and to provide at a circuit voltage node an output current proportional to said instantaneous algebraic difference between said left and right signal channel voltages; and circuit means connected to pass said output current through a common impedance to produce thereacross said ground-referenced third signal channel voltage.

3. Signal translating apparatus for operation with stereophonic signals represented by respective separate left and right signal voltages, comprising in combination:

circuit apparatus connected to receive both of said separate left and right signal voltages and to derive therefrom a third signal voltage proportional to an instantaneous algebraic difference between said separate left and right signal voltages;

a laterally-spaced pair of loudspeakers positioned and oriented to radiate in substantially one direction toward a reception region;

a third loudspeaker positioned and oriented to radiate toward said reception region in a direction substantially opposite to that of said pair of loudspeakers;

a pair of amplifier devices of substantially equal gain, each connected to receive said separate left and right signal voltages as individual input signals and to couple corresponding individual output signals of said pair of amplifier devices to respective loudspeakers comprising said pair of laterally-spaced loudspeakers; and a third amplifier device connected via an adjustable attenuating device to receive said third signal voltage as an input stimulus and to couple a resulting output signal from said third amplifier device to said third loudspeaker.

4. Signalling apparatus for operation with stereophonic signals represented by individual ground-referenced left and right signal voltages, the apparatus comprising:

first amplifier device connected to produce a reverse-polarity replica of one of said signal voltages;

a plurality of resistive devices connected to a circuit voltage node for summing current proportional to said reverse-polarity replica of one of said signal voltages with current proportional to a remaining one of said signal voltages to provide at said circuit voltage node a resulting current proportional to an instantaneous algebraic difference between said left and right signal voltages; and second amplifier device connected to the circuit voltage node to cause said resulting current to flow through a common impedance to produce thereacross a ground-referenced signal voltage proportional to said instantaneous algebraic difference between said left and right signal voltages.

* * * * *